United States Patent
Meinders et al.

(10) Patent No.: US 6,358,560 B1
(45) Date of Patent: Mar. 19, 2002

(54) BARRIER RIB FORMATION

(75) Inventors: Erwin R. Meinders; Petrus C. P. Bouten; Joseph C. M. Bosman, all of Eindhoven (NL); Joseph R. R. Pankert, Aachen (DE); Maarten Buijs, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/521,713

(22) Filed: Mar. 9, 2000

(30) Foreign Application Priority Data

Mar. 10, 1999 (EP) .............................. 99200726
Nov. 9, 1999 (EP) ............................ 99203742

(51) Int. Cl.⁷ ........................... B05D 3/00; B05D 5/00; B05D 5/06
(52) U.S. Cl. ................. 427/162; 427/277; 427/286; 427/356; 118/44; 118/56; 118/100
(58) Field of Search .................. 427/162, 164, 427/165, 331, 277, 286, 356, 358; 65/17.3, 60.1; 118/44, 56, 211, 100, 125

(56) References Cited

U.S. PATENT DOCUMENTS 4,749,432 A * 6/1988 Ando et al. ................. 156/257
4,814,204 A * 3/1989 Carey et al. ................. 427/286
5,720,812 A * 2/1998 Madrzak et al. ............. 118/126
5,853,446 A * 12/1998 Carre et al. .................... 65/17.3

FOREIGN PATENT DOCUMENTS

| EP | 0472781 | | 3/1992 | ............. H01J/9/20 |
| EP | 0837486 A2 | * | 4/1998 | |
| EP | 0875915 A2 | * | 11/1998 | |
| GB | 1331595 | * | 9/1973 | |
| JP | 10188793 A | * | 7/1998 | |
| JP | 10294059 A | * | 11/1998 | |
| JP | 11067106 A | * | 3/1999 | |

* cited by examiner

Primary Examiner—Shrive Beck
Assistant Examiner—Wesley Markham

(57) ABSTRACT

In a method of manufacturing a display device, a substrate is provided with a pattern of barrier ribs of frit material by moving a squeegee across a substrate. The barrier ribs extend in a longitudinal direction and have a predefined profile in cross-section which is perpendicular to the longitudinal direction. A contact portion of the squeegee has grooves which correspond in cross-section to the predefined cross-sectional profile of the barrier ribs.

22 Claims, 4 Drawing Sheets

BARRIER RIB FORMATION

FIELD OF THE INVENTION

The invention relates to display devices, and more particulary to a method of manufacturing a display device with a substrate having barrier ribs.

BACKGROUND AND SUMMARY OF THE INVENTION

A method of manufacturing a display device comprising a substrate having barrier ribs is known. EP-A 0 472 781 describes a thick-film printing method which comprises the steps of printing a glass paste on a transparent flat plate by using a printing screen and a so-called squeegee (or doctor blade or structured knife), and subsequent drying of the paste. The printing and drying steps are repeated five to ten times. However, the five to ten repetitions of superposed printing of the glass paste disturb the required shape of the barrier ribs and cause an inaccuracy of their height. This may lead to a reduction of the quality of the images that are displayed on the display device. The cited document describes an improvement of the printing method by providing, prior to the printing step, the substrate with a layer of an organic film having grooves. The grooves are filled with a glass paste using a printing method several times, and a drying step for solidifying the glass paste, after which the organic layer is removed. However, this method has the drawback that it comprises many process steps and is therefore time-consuming and costly.

It is an object of the invention to reduce the problems and drawbacks indicated above. The invention relates to a method of manufacturing a display device comprising a substrate having barriers ribs, the method comprising the steps of providing a substrate having a surface, and providing a pattern of barrier ribs of frit material by means of a squeegee, the barrier ribs extending in a longitudinal direction parallel to the surface and having a predefined profile in a cross-section perpendicular to the longitudinal direction.

The method of manufacturing a display device according to the invention is characterized in that the squeegee or the substrate is moved in the longitudinal direction, a contact portion of the squeegee being in contact with the surface of the substrate, said contact portion comprising a profile for defining the predefined profile, the profile having a groove structure comprising grooves in a cross-section which corresponds to the predefined profile in the cross-section of the barrier ribs. In practice, the cross-section of the barrier ribs after curing may slightly differ from the cross-section of the grooves. This method of manufacturing a display device has the advantage that it is simple and that an accurate profile of the barrier ribs can be obtained in one manufacturing step, apart from an additional solidifying step.

An embodiment of a method of manufacturing a display device according to the invention is characterized in that the contact portion of the squeegee has a front surface, the front surface and the surface of the substrate enclosing an angle (β) in the range between 5° and 120°. This embodiment provides much freedom in the design of the squeegee. In addition, in this embodiment, the squeegee acts as a wedge. The wedge shape causes the build-up of a pressure gradient in the frit material when the squeegee is moved across the substrate, which forces the frit paste to flow through the grooves. Different pressure gradients can be obtained by variation of the angle (β).

A further embodiment of a method of manufacturing a display device according to the invention is characterized in that the angle (β) is substantially equal to 90°, the contact portion comprising a contact surface which is in contact with the surface of the substrate, the contact surface having a length s extending in the longitudinal direction and being at least equal to 0.05 mm. In this embodiment, the frit paste is in contact with the grooves of the squeegee for a relatively long time. Experimentally, it has been observed that an extended residence time improves the curing process of the frit paste. In addition, a contact portion of the squeegee is in contact with the surface of the substrate, which helps building up a pressure in the frit material and thus improves the formation of the barrier ribs.

A further embodiment of a method of manufacturing a display device according to the invention is characterized in that the length s of the contact surface is at least equal to 0.5 mm. This embodiment has the advantage that the contact portion of the squeegee is extended. The extra residence time obtained in this way can be used to cure the barrier ribs while they are still within the grooves of the squeegee.

A further embodiment of a method of manufacturing a display device according to the invention is characterized in that the squeegee has a slanting surface, the slanting surface and the contact surface enclosing an angle of 180°−α, α being in the range of −5° to 25°. The wedge shape of the squeegee causes the build-up of a pressure gradient in the frit material when the squeegee is moved across the substrate, which forces the frit paste to flow through the grooves. Different pressure gradients can be obtained by variation of the angle α.

A further embodiment of a method of manufacturing a display device according to the invention is characterized in that the angle α is in the range of 20° to 90°. Good results were obtained when the angle α was chosen in this range.

A further embodiment of a method of manufacturing a display device according to the invention is characterized in that the squeegee is provided with a detachable knife having the predefined profile. This embodiment of the squeegee provides a quick way of changing the predetermined profile. Such a situation may occur if a switch to a different width or height of the predetermined profile is required.

A further embodiment of a method of manufacturing a display device according to the invention is characterized in that the squeegee is provided with a frit expansion room. In this embodiment, the method of manufacturing is less dependent upon the angle (β), which results in a more stable process.

Another embodiment of a method of manufacturing a display device according to the invention is characterized in that the squeegee has a rear surface opposite the front surface, the grooves extending from the front surface to the rear surface, the grooves being funnel-shaped, and the cross-section of the grooves near the front surface having an area which is equal to or larger than the area of the cross-section of the grooves near the rear surface.

In this embodiment, the grooves have a funnel shape, which helps to increase a further build-up of the pressure in the frit material and consequently improves the solidification of the barrier ribs.

A further embodiment of a method of manufacturing a display device according to the invention is characterized in that the frit expansion room has a smallest distance h3 to the substrate and the groove structure comprises a structure of protrusions spaced at regular intervals w, the protrusions having a length h1 and a width between the protrusions equal to w1, where $$0.3 \times h3 \times w < h1 \times w1 < 0.75 \times h3 \times w$$

In this embodiment, a stable process for forming the barrier ribs is obtained.

These and other aspects of the invention will be elucidated with reference to the embodiments described hereinafter.

BRIEF DESCRIPTION OF THE DRAWING FIGURES

Figure 7:
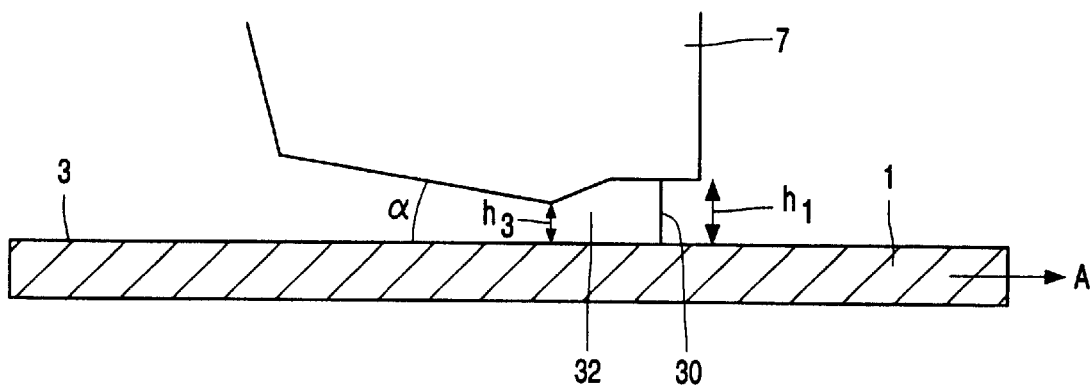
Figure 8:
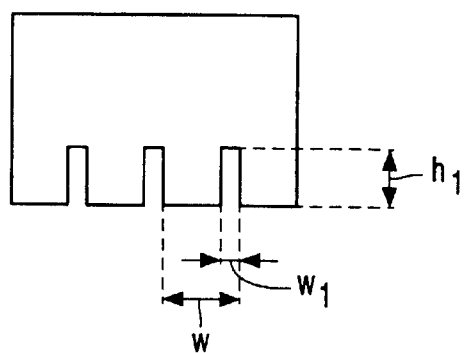

FIGS. 6 A, 6B and 6C show various embodiments of the detachable knife according to the invention;

FIG. 7 shows a cross-section of a squeegee according to the invention having a frit expansion room; and FIG. 8 shows a groove structure according to the invention.

In general, like reference numerals identify like elements.

DETAILED DESCRIPTION

Figure 1:
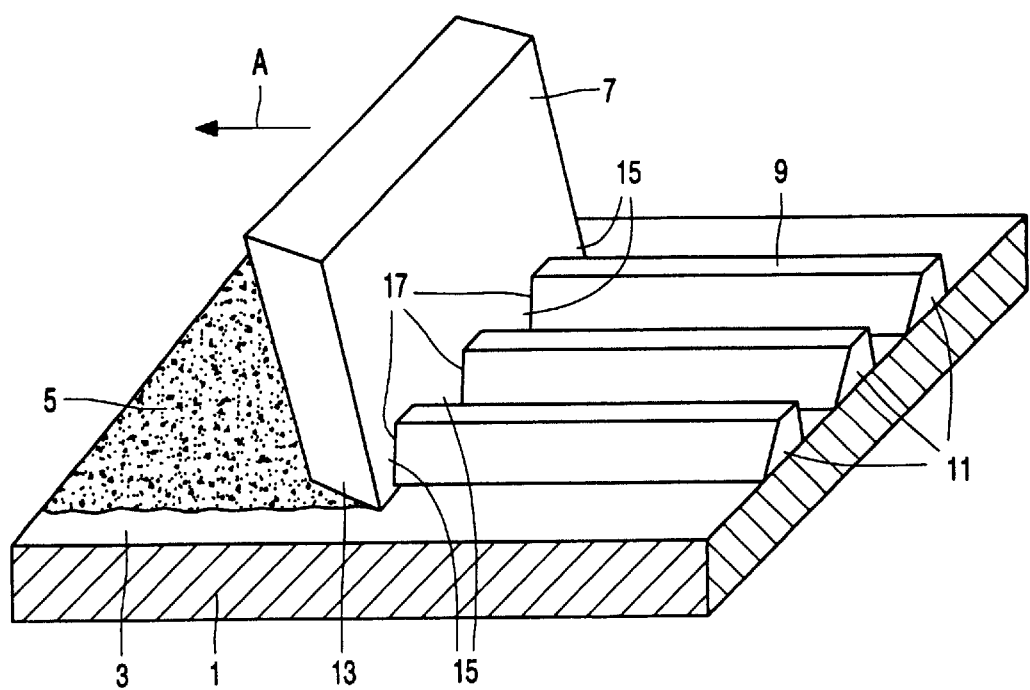
FIG. 1 is a perspective view of a first embodiment of a squeegee according to the invention.

FIG. 1 shows a substrate 1, usually comprising glass, for use in display devices like, for example, displays of the Plasma Addressed Liquid Crystal Display (PALC) type or the Plasma Display Panel (PDP) type. The substrate 1 has a surface 3, which is covered with a layer of frit material 5 of a suitably chosen composition. By moving a squeegee 7 across the layer of frit material 5 in a direction parallel to the surface 3, a pattern of barrier ribs 9 is provided in the layer of frit material 5. Alternatively, an amount of frit material is shifted by the squeegee to form the barrier ribs 9. In FIG. 1, the direction of movement of the squeegee 7 is indicated by an arrow A. The barrier ribs 9 extend in a longitudinal direction, which corresponds to the direction A, and have a predefined profile 11 in a cross-section which is perpendicular to the longitudinal direction. The squeegee 7 is moved in the longitudinal direction, a contact portion 13 being in contact with the surface of the substrate 3. Alternatively, the substrate 1 is shifted below a fixed squeegee. The contact portion 13 comprises a profile 15 for defining the predefined profile 11. The profile 15 has grooves 17 in a cross-section which corresponds to the predefined profile 11 in the cross-section of the barrier ribs 9. Good results were obtained with a squeegee 7 comprising grooves having a pitch between the grooves of 360 μm, a height of 170 μm and a width of 80 μm at the top of the barrier rib.

After formation, the barrier ribs 9 are solidified. The particular solidification step depends upon the composition of the initial frit material and can be done by drying, UV-polymerization and subsequently baking, sintering or any other suitable further solidification step. In practice, the cross-section of the barrier ribs after solidifying may slightly differ from the cross-section of the grooves.

Figure 2:
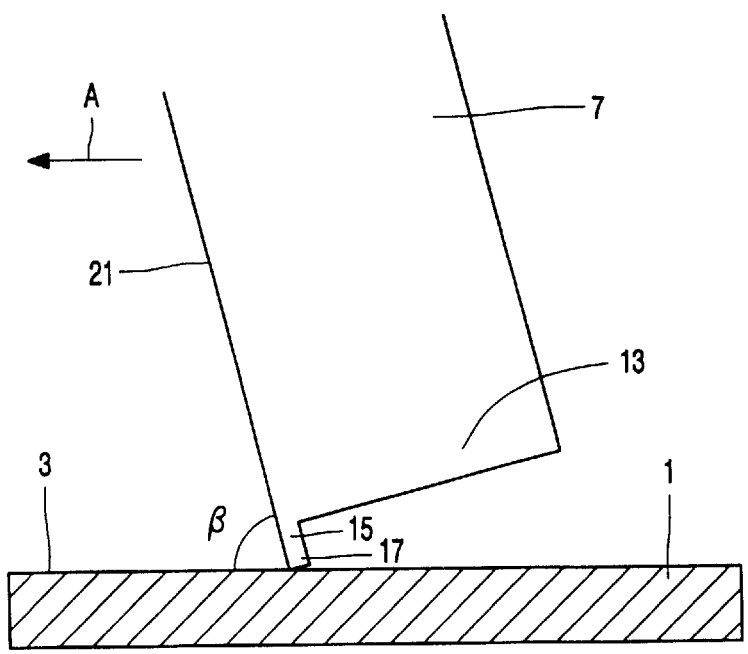
FIG. 2 is a sectional view in the longitudinal direction of a second embodiment of a squeegee according to the invention.

FIG. 2 is a cross-section of an embodiment of the squeegee. A front surface 21 facing forward in the direction of movement of the squeegee and the surface 3 of the substrate 1 enclose an angle β. The angle β may be chosen within a range of 5° to 120° so as to optimize the process of formation of the barrier ribs.

In the shown embodiment, the contact portion 13 comprises an extending profile 15. The profile 15 having the grooves 17 may be a separate piece of metal or a synthetic material in which the grooves 17 are made, which is thereafter connected to the squeegee 7. Alternatively, the profile 15 with the grooves 17 is provided directly in the contact portion 13 which, in this case, has no extending parts.

Figure 3:
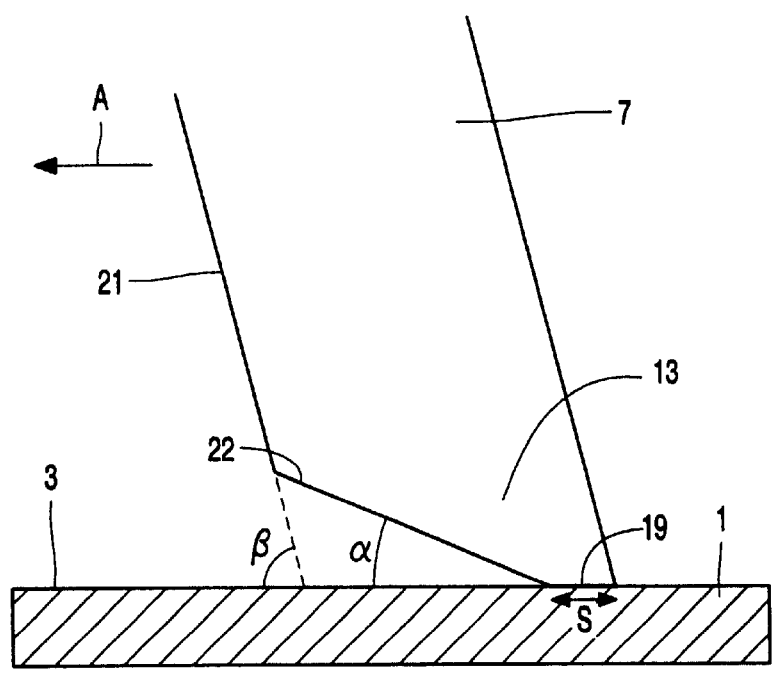
FIG. 3 is a sectional view in the longitudinal direction of a third embodiment of a squeegee according to the invention.

FIG. 3 shows the contact portion 13 which has a contact surface 19 being in contact with the surface 3 of the substrate 1. The contact surface 19 has a length s extending in the longitudinal direction. The squeegee 7 has a front surface 21 facing forward in the direction of movement of the squeegee, indicated by an arrow A in the drawing. The squeegee 7 has a slanting surface 22. The slanting surface 22 and the contact surface 19 of the squeegee 7 enclose an angle of 180°–α. Good results were obtained with α varying between –5° and 25°, and the length s being at least equal to 0.05 mm. The extension s can be used to guide the barrier ribs 9 and control the possible swell after release by the squeegee 7. When the squeegee 7 is moved through the frit material 5, a pressure gradient is built up, which forces the frit material 5 through the grooves 17. Different pressure gradients can be obtained by variation of the angle α.

The shape of the grooves 17 can be adapted to compensate for possible slumping of the barrier ribs 11 after formation.

Figure 4:
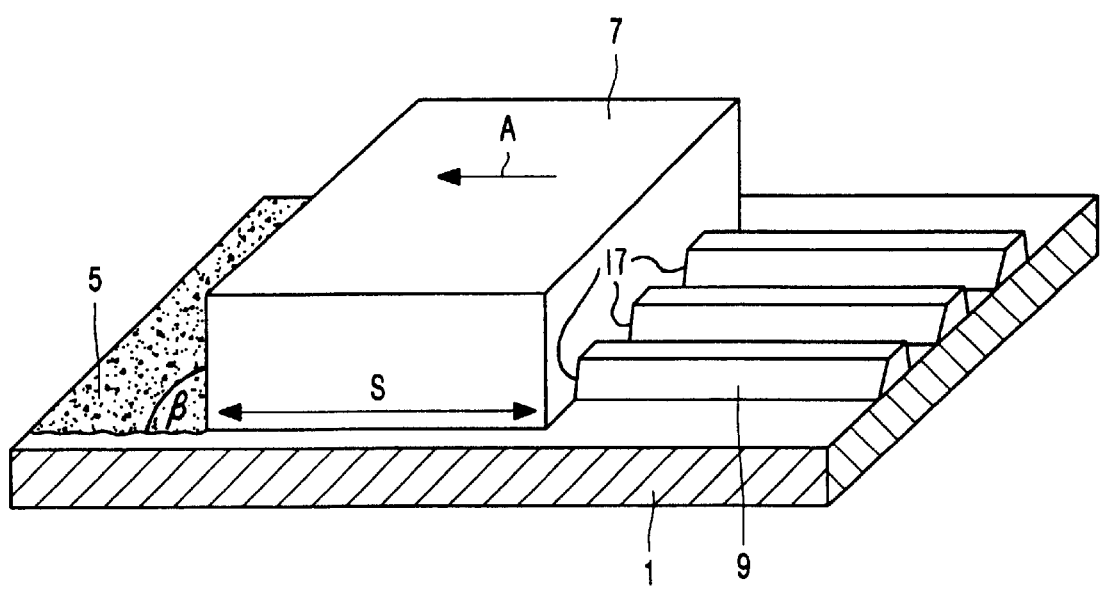
FIG. 4 is a perspective view of a fourth embodiment of a squeegee according to the invention.

Another embodiment of the squeegee according to the invention is shown in FIG. 4. Here, s is extended and the angle β is substantially equal to 90°. The extra residence time created in this way can be used to solidify the barrier ribs while they are still within the grooves 17 of the squeegee 7. In one embodiment, s is at least equal to 0.5 mm.

Figure 5:
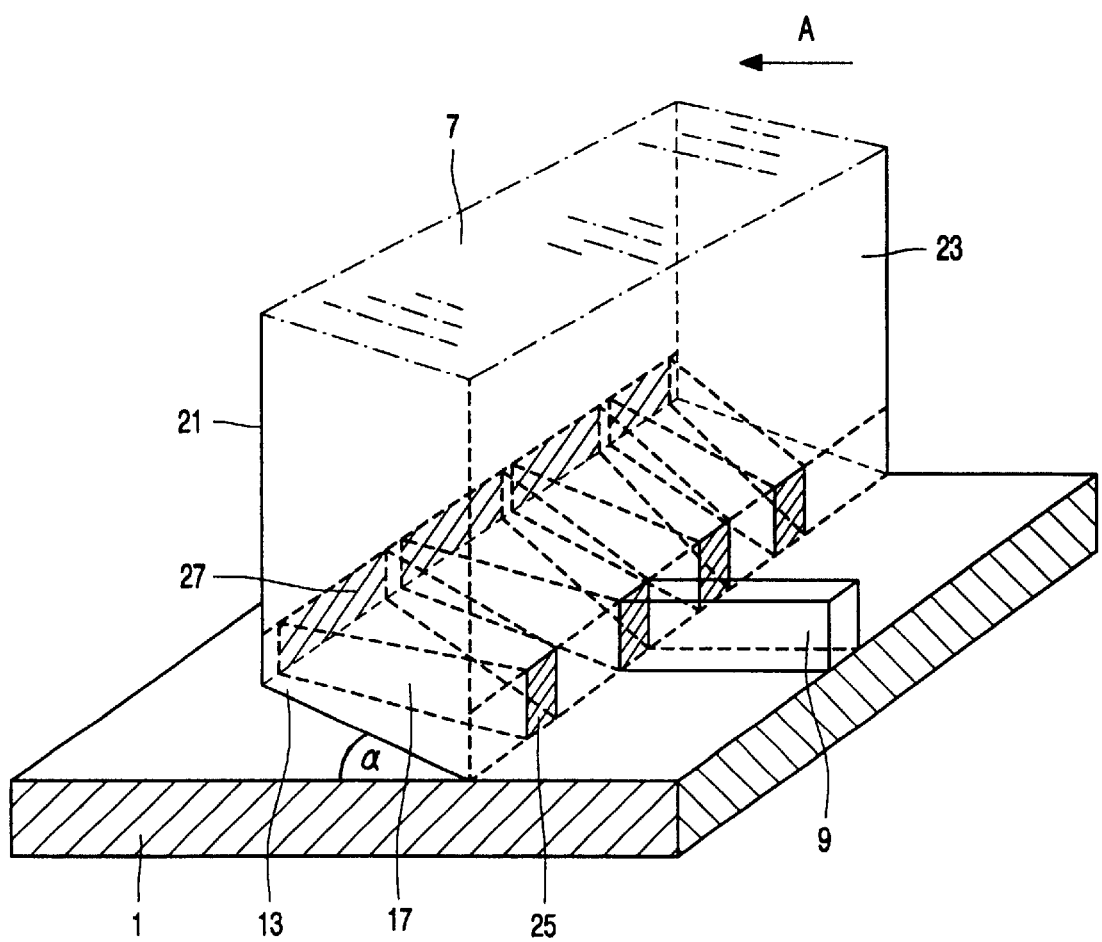
FIG. 5 shows schematically, in a perspective view, a fifth embodiment of a squeegee according to the invention.

The squeegee 7 shown in FIG. 5 has a rear surface 23 opposite the front surface 21. The contact portion 13 of the squeegee 7 comprises grooves 17 which extend from the front surface 21 to the rear surface 23. These grooves 17 are funnel-shaped and the cross-section 27 of the grooves 17 near the front surface 21 has an area which is equal to or larger than the area of the cross-section 25 of the grooves 17 near the rear surface 23. Suitable values for the angle α are similar to those used in the embodiment shown in FIG. 3.

This embodiment has the advantage that, in view of the funnel shape, extra pressure can be built up in the frit material, which reduces the curing time of the barrier ribs 9.

Figures 6A, 6B, 6C:
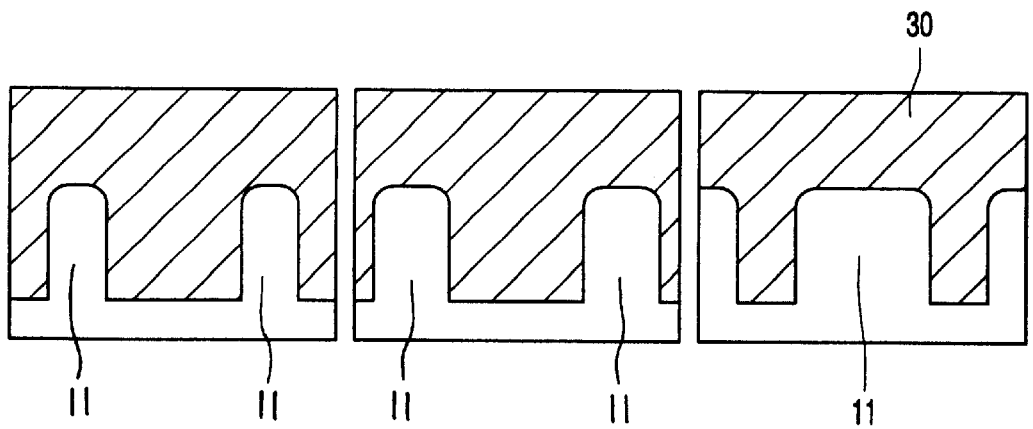

FIGS. 6A, 6B and 6C show various embodiments of the detachable knife 30 according to the invention. This embodiment of the squeegee provides a quick way of changing the predetermined profile 11 of the barrier ribs 9. Such a situation may occur if a switch to a different width or height of the predetermined profile 11 is required.

FIG. 7 shows a cross-section of a -squeegee according to the invention having a frit expansion room 32 with a cross-section that increases toward the rear surface of the squeegee. In the expansion room 32, expansion of the frit paste is allowed to take place this leads to a higher accuracy in the manufactured profile of the barrier ribs 9. In practice good results were obtained a when the expansion room 32 was located close to the knife 30. A smallest distance of the frit expansion room 32 to the substrate 1 is indicated by h3.

FIG. 8 shows a groove structure comprising a structure of protrusions spaced at regular intervals w, the protrusions having a length h1 and a width between the protrusions equal to w1. A stable operating regime for the method of manufacturing is obtained if the following relation holds:

$$h3 \times w = 0.5 \times h1 \times w1.$$

This relation is useful in designing the groove structure and the knife 30 and squeegee 7.

Example: w1=60 μm, h1=200 μm, 0.5°<α<3.5°, w=360 μm, and h3≈70 μm.

A useful working area is defined by $$0.3 \times h3 \times w < h1 \times w1 < 0.75 \times h3 \times w$$

In summary, the invention comprises a method of manufacturing a display device comprising a substrate 1 having barrier ribs 9. The method provides a pattern of barrier ribs 9 of frit material 5 by moving a squeegee 7 relative to a substrate 1. The barrier ribs 9 extend in a longitudinal direction and have a predefined profile 11 in a cross-section which is perpendicular to the longitudinal direction.

A contact portion 13 of the squeegee 7 comprises a profile 15 for defining the predefined profile 11. The profile 15 has a groove structure comprising grooves 17 in a cross-section corresponding to the predefined profile 11 in the cross-section of the barrier ribs 9.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

What is claimed is:

1. A method of manufacturing a display device having a substrate with barrier ribs, comprising:
   providing a substrate having a substrate surface;
   providing frit material;
   providing a squeegee having a contact portion comprising a front surface, a rear surface opposite the front surface, a contact surface, and a groove structure including grooves opening onto at least the front surface and the rear surface;
   positing the substrate and the squeegee such that
      the contact surface of the squeegee is positioned against the substrate surface,
      the groove structure at the front surface has a cross-sectional front groove profile in a plane perpendicular to a longitudinal direction parallel to the substrate surface,
      the groove structure at the rear surface has a cross-section a rear groove profile in another plane perpendicular to the longitudinal direction, and
      the front groove profile has greater cross-sectional area than the rear groove profile; and
   moving at least one of the squeegee and the substrate in the longitudinal direction relative to the other of the squeegee and the substrate while the contact portion of the squeegee is in contact with the substrate surface, resulting in a pattern of barrier ribs of the fit material on the substrate surface, the barrier ribs extending in the longitudinal direction and having a cross-sectional rib profile perpendicular to the longitudinal direction corresponding with the rear groove profile.

2. The method of claim 1, further comprising providing the squeegee with a frit expansion room such that during said moving step, the frit expansion room has a smallest distance h3 to the substrate surface and the rear groove structure comprises a structure of protrusions spaced at regular intervals w, the protrosions having a length h1 and a width between the protrusions equal to w1, where $0.3 \times h3 \times w < h1 \times w1 < 0.75 \times h3 \times w$.

3. The method of claim 2, wherein during said moving step the front surface and the substrate surface subtend an angle of less than 90°.

4. The method of claim 2, wherein a slanting surface extends from the front surface to the contact surface, such that during said moving step the slanting surface meets the substrate surface at an angle of less than 90°, causing compression of the frit material.

5. The method of claim 4, wherein during said moving step the slanting surface meets the substrate surface at an angle between 20° and 90°.

6. The method of claim 1, wherein during said moving step the front surface and the substrate surface subtend an angle of less than 90°.

7. The method of claim 1, wherein a slanting surface extends from the front surface to the contact surface, such that during said moving step the slanting surface meets the substrate surface at an angle of less than 90°, causing compression of the frit material.

8. The method of claim 7, wherein during said moving step the slanting surface meets the substrate surface at an angle between 20° and 90°.

9. A method of manufacturing a display device having a substrate with barrier ribs, comprising:
   providing a substrate having a substrate surface;
   providing frit material;
   providing a squeegee having a contact portion comprising a front surface, a rear surface opposite the front surface, a contact surface, and a groove structure including grooves opening onto at least the front surface and the rear surface, and a frit expansion room;
   positioning the substrate and the squeegee such that the contact surface of the squeegee is positioned against the substrate surface and the groove structure has a cross-sectional groove profile in a plane perpendicular to a longitudinal direction parallel to the substrate surface; and
   moving at least one of the squeegee and the substrate in the longitudinal direction relative to the other of the squeegee and the substrate while the contact portion of the squeegee is in contact with the substrate surface, resulting in a pattern of barrier ribs of the frit material on the substrate surface, the barrier ribs extending in the longitudinal direction and having a cross-sectional rib profile perpendicular to the longitudinal direction corresponding with the groove profile,
   such that during said moving step, the frit expansion room has a smallest distance h3 to the substrate surface and the groove structure comprises a structure of protrusions space at regular intervals w, the protrusions having a length h1 and a width between the protrusions equal to w1, $0.3 \times h3 \times w < h1 \times w1 < 0.75 \times h3 \times w$.

10. The method of claim 9, wherein during said moving step the front surface and the substrate surface subtend an angle of less than 90°.

11. The method of claim 9, wherein a slanting surface extends from the front surface to the contact surface, such that during said moving step the slanting surface meets the substrate surface at an angle of less than 90°, causing compression of the frit material.

12. The method of claim 11, wherein during said moving step the slanting surface meets the substrate surface at an angle between 20° and 90°.

13. A method of manufacturing a display device having a substrate with barrier ribs, comprising:

providing a substrate having a substrate surface;

providing frit material;

providing a squeegee having a contract portion comprising a front surface, a rear surface opposite the front surface, a contract surface, and a groove structure including grooves opening onto at least the front surface and the rear surface, and a frit expansion room having a cross-section that increases toward the rear surface;

positioning the substrate and the squeegee such that the front surface and the substrate surface subtend an angle of less than 90°, the contact surface of the squeegee is positioned against the substrate surface, and the groove structure has a cross-sectional groove profile in a plane perpendicular to a longitudinal direction parallel to the substrate surface; and moving at least one of the squeegee and the substrate in the longitudinal direction relative to the the other of the squeegee and the substrate while the contact portion of the squeegee is in contact with and sliding against the substrate surface, resulting in a pattern of barrier ribs of the frit material on the substrate surface, the barrier ribs extending in the longitudinal direction and having a cross-sectional rib profile perpendicular to the longitudinal direction corresponding with the groove profile.

14. The method of claim 13, further comprising providing the squeegee with a frit expansion room such that during said moving step, the frit expansion room has a smallest distance h3 to the substrate surface and the groove structure comprises a structure of protrusions spaced at regular intervals w, the protrusions having a length h1 and a width between the protrusions equal to w1, where $0.3 \times h3 \times w < h1 \times w1 < 0.75 \times h3 \times w$.

15. The method of claim 14, wherein a slanting surface extends from the front surface to the contact surface, such that during said moving step the slanting surface meets the substrate surface at an angle of less than 90°, causing compression of the frit material.

16. The method of claim 15, wherein during said moving step the slanting surface meets the substrate surface at an angle between 20° and 90°.

17. The method of claim 13, wherein a slanting surface extends from the front surface to the contact surface, such that during said moving step the slanting surface meets the substrate surface at an angle of less than 90°, causing compression of the frit material.

18. The method of claim 17, wherein during said moving step the length of the contact surface continually in contact with and sliding against the substrate surface is at least equal to 0.05 mm.

19. The method of claim 17, wherein during said moving step the length of the contact surface continually in contact with and sliding against the substrate surface is at least equal to 0.5 mm.

20. The method of claim 17, wherein during said moving step the slanting surface meets the substrate surface at an angle between 20° and 90.

21. The method of claim 13, wherein during said moving step the length of the contact surface continually in contact with and sliding against the substrate surface is at least equal to 0.05

22. The method of claim 13, wherein during said moving step the length of the contact surface continually in contact with and sliding against the substrate surface is at least equal to 0.5 mm.

* * * * *